United States Patent [19]

Morico

[11] Patent Number: 5,316,684
[45] Date of Patent: May 31, 1994

[54] PROCESS FOR REDUCTION OF HEXAVALENT CHROMIUM

[76] Inventor: John L. Morico, 268 Willow St., Hew Haven, Conn. 06511

[21] Appl. No.: 762,643

[22] Filed: Sep. 19, 1991

Related U.S. Application Data

[63] Continuation-in-part of Ser. No. 563,840, Aug. 6, 1990, abandoned, which is a continuation of Ser. No. 357,881, May 30, 1989, abandoned.

[51] Int. Cl.$^5$ .............................. C02F 1/70; C02F 9/00
[52] U.S. Cl. .................................... 210/757; 210/904; 210/913
[58] Field of Search ............... 210/757, 758, 759, 904, 210/913

[56] References Cited

U.S. PATENT DOCUMENTS 3,505,217  4/1970  Morico ................................ 210/757
3,896,209  7/1975  Fournier et al. ..................... 210/759
4,104,162  8/1978  Junkermann et al ............... 210/759

Primary Examiner—Ivars Cintins
Attorney, Agent, or Firm—John H. Crozier

[57] ABSTRACT

Hexavalent chromium is reduced to trivalent chromium by reacting the hexavalent chromium with peroxide in acidic solution. In another aspect of the invention, the hexavalent chromium reduction with peroxide step may take place after the step of the destruction with aldehyde of any cyanide or cyanide compounds present, so that the peroxide may destroy any excess aldehyde remaining after the first step. No materials are added which have to be removed later in the process. In either case, the waste solution may then be treated with sodium hydroxide, or other conventional materials, to precipitate chromium hydroxide and effect removal of the hazardous chromium from the waste stream.

6 Claims, No Drawings

PROCESS FOR REDUCTION OF HEXAVALENT CHROMIUM

This is a continuation-in-part of co-pending application Ser. No. 07/563,840 filed on Aug. 6, 1990, now abandoned; which is a continuation of co-pending application Ser. No. 07/357,881 filed on May 30, 1989, now abandoned.

BACKGROUND OF THE INVENTION

1. Field of the Invention

The present invention relates to the treatment of wastewater solutions generally and, more particularly, to the treatment of such waste solutions containing hexavalent chromium so as to render the waste solutions safe for disposal.

2. Background Art

Waste solutions containing toxic amounts of hexavalent chromium are obtained in a variety of industrial operations, for instance metal stripping processes and electroplating processes. These waste solutions must be disposed of and, because of their hexavalent chromium content, serious problems were encountered in their disposal in the past, due to their toxicity to both aquatic and nonaquatic life. A conventional method of treatment is to treat these solutions with a reducing agent. When hexavalent chromium is reduced to trivalent chromium, the chromium is in a form which can be precipitated from solution in conventional treatment processes. Conventional methods of reducing hexavalent chromium include treatment with sodium metabisulfite, sulfur dioxide, or ferrous sulfate, in acidic solution.

The disadvantages of these conventional treatment methods are that solutions have to be made up from powdered materials, the solutions are generally corrosive, objectionable gases may have to be controlled, and/or materials are being added to the waste stream which will require later removal. The latter disadvantage is of particular importance, as it makes little sense to increase the burden on the overall treatment system.

It would, therefore, be desirable to employ a process for reducing hexavalent chromium in which no materials are added to the waste stream which need be removed later and in which process any added materials are relatively easy and safe to store and handle.

Frequently, particularly in waste streams from plating operations, cyanide and cyanide compounds are present in addition to hexavalent chromium. In my U.S. Pat. No. 3,505,217, issued Apr. 7, 1970, which is incorporated herein by reference, I show how free and combined cyanide in a waste solution can be treated with aldehyde or water-soluble bisulfite addition reaction product compounds of the aldehyde in basic solution to convert the cyanides to relatively harmless nitrogen compounds. While this method satisfactorily treats the cyanides as intended, the treatment may result in a residual concentration of aldehyde being present and, since the treatment takes place in basic solution, there can be no reduction of the hexavalent chromium which may be present.

Accordingly, it is a principal object of the present invention to provide a process for reducing hexavalent chromium without the introduction of materials which require later removal from a waste stream.

Another object of the invention is to provide a process for reducing hexavalent chromium which will also destroy residual aldehyde remaining from a previous cyanide treatment step.

Other objects of the invention, as well as particular features and advantages thereof will, be apparent from the following description.

SUMMARY OF THE INVENTION

The present invention achieves the above objects, among others, and substantially overcomes the limitations of conventional methods of reducing hexavalent chromium by reacting the hexavalent chromium with peroxide in acidic solution. In another aspect of the invention, the hexavalent chromium reduction with peroxide step may take place after the step of the destruction with aldehyde of any cyanide or cyanide compounds present, so that the peroxide may destroy any excess aldehyde remaining after the first step. No materials are added which have to be removed later in the process. In either case, the waste solution may then be treated with sodium hydroxide, or other conventional materials, to precipitate chromium hydroxide and effect removal of the hazardous chromium from the waste stream.

DESCRIPTION OF THE PREFERRED EMBODIMENTS

In the broad aspect of the invention, to a solution containing hexavalent chromium is added sulfuric acid to bring the pH of the solution to no more than on the order of pH 3 and, preferably, to a pH in the range of greater than 1.5 to less than about than 3. Preferably, a slight excess amount of hydrogen peroxide is added. The reduction of the hexavalent chromium to trivalent chromium is very rapid and complete and is relatively independent of temperature. Other acids and other peroxides may be employed as well; however, the use thereof may introduce undesirable components when dealing with a waste stream.

When treating a waste stream which contains both hexavalent chromium and cyanide or cyanide compounds, to the waste stream is first added an aldehyde, preferably formaldehyde, or other material(s) described in U.S. Pat. No. 3,505,217, or their equivalents, in a slight excess in basic solution to convert the free and combined cyanide in the waste solution to relatively harmless nitrogen compounds. The waste solution is then made acidic with sulfuric acid, in the range of greater than 1.5 to less than about 3, and hydrogen peroxide excess, is added. The hydrogen peroxide reacts with the hexavalent chromium reducing it to trivalent chromium. Any excess aldehyde remaining after the first step reacts with the excess hydrogen peroxide to produce harmless compounds.

In either case, the waste solution may then be treated conventionally, for example with sodium hydroxide at about pH 9, to precipitate chromium hydroxide and effect removal of hazardous chromium from the waste stream. The hydrogen peroxide will not itself be a contaminant and advantageously adds oxygen to the waste solution.

EXAMPLES

I.
(a) Starting with 22 mg/L hexavalent chromium in 0.125 percent sulfuric acid (pH 1.5)
(b) add to (a), 4 ml/L of 13 percent hydrogen peroxide solution (c) negative test for hexavalent chromium using diphenylcarbazide reaction II.
(a) Starting with 13 percent hydrogen peroxide at 25 ml/L in 0.125 percent sulfuric acid
(b) add sulfuric acid to 12.5 ml/L
(c) add hexavalent chromium to 22 ml/L concentration
(d) 10 minute retention time
(e) negative test for hexavalent chromium using diphenylcarbazide reaction III.
(a) Starting with 86.6 mg/L hexavalent chromium in 0.5 percent sulfuric acid
(b) 5 minute retention time
(c) add 13 percent hydrogen peroxide to 1 ml/L
(d) 5 minute retention time
(e) very slight positive test for hexavalent chromium using diphenylcarbazide reaction IV. Starting with 200 ml of 5 percent sodium hydroxide with 0.75 ml of 37 percent formaldehyde:

| ml hydrogen peroxide added | mv reading ORP electrode | qualitative aldehyde estimate |
|---|---|---|
| 0.0 | −440 | |
| 1.0 | −508 | Positive, 200–500 ppm |
| 2.0 | −353 | |
| 2.2 | −290 | |
| 2.4 | −112 | |
| 2.6 | −94 | |
| 3.0 | −82 | Slight positive, 10–20 ppm |

V. Starting with 200 ml of sulfuric acid with 0.375 percent 37 percent formaldehyde:

| ml hydrogen peroxide added | mv reading ORP electrode | qualitative aldehyde estimate |
|---|---|---|
| 0.0 | 330 | Very slight positive, 10–20 ppm |
| 0.2 | 524 | |
| 0.6 | 548 | Very slight positive, 1–2 ppm |
| 2.0 | 552 | |
| 3.0 | 551 | |
| 4.0 | 551 | |
| added 30 ml 2.5N sodium hydroxide | 153 | Very slight positive, 5–10 ppm |
| added 40 ml 2.5 sodium hydroxide | −86 | Heavy gassing |
| added 50 ml 2.5N sodium hydroxide | −117 | Heavy gassing |

Examples I–III show that there is complete or nearly complete reduction of hexavalent chromium under a wide range of reaction conditions. As noted above, acids other than sulfuric acid may be employed and peroxides other than hydrogen peroxide may be employed; however, the ones given are preferable, due to reasons of economy and due to the fact that other reactants may introduce components which are undesirable and/or may have to be removed later.

Examples IV and V demonstrate that there is a pronounced reaction between aldehyde and peroxide under both acidic and alkaline conditions, with aldehyde concentration being reduced to a very low level.

It will thus be understood that the objects set forth above, among those made apparent from the preceding description are efficiently attained. It will be understood that the above specific examples are intended to be illustrative only and that the invention is not limited to the specific conditions, materials, or concentrations given therein, but encompasses the full range of effective conditions and concentrations which may be used in practicing the invention.

It is also to be understood that the following claims are intended to cover all of the generic and specific features of the invention herein described and all statements of the scope of the invention which, as a matter of language, might be said to fall therebetween.

I claim:

1. A process for reducing hexavalent chromium in aqueous solution containing cyanide or cyanide compounds, comprising the steps of:
   (a) adding to said solution, in at least the stoichiometric amount for reaction with all the cyanide present, at least one material selected from the group consisting of an aldehyde and water-soluble bisulfite addition reaction product compounds of the aldehyde;
   (b) supplying an acid to the reaction mixture in an amount sufficient to accelerate release of the cyanide from said cyanide compounds;
   (c) reacting said selected material and said cyanide until said cyanide has been converted into nontoxic materials;
   (d) adding a peroxide compound in an amount sufficient to reduce said hexavalent chromium to trivalent chromium; and
   (e) reacting said peroxide and said hexavalent chromium until said hexavalent chromium has been reduced to trivalent chromium.

2. The process defined in claim 1, wherein at least the stoichiometric amount of said peroxide is added.

3. The process defined in claim 1 wherein said peroxide is hydrogen peroxide.

4. The process defined in claim 1, wherein said chromium solution is rendered acidic to a pH of no more than about 3.

5. The process defined in claim 4, wherein said solution is rendered acidic by the addition of sulfuric acid.

6. The process defined in claim 1, wherein said peroxide compound is added in an amount sufficient to react with and destroy any excess of said selected material.

* * * * *